(12) United States Patent
Kawasaki et al.

(10) Patent No.: US 7,289,338 B2
(45) Date of Patent: Oct. 30, 2007

(54) INPUT TO OUTPUT ISOLATED DC-DC CONVERTER

(75) Inventors: Koji Kawasaki, Anjo (JP); Keiji Shigeoka, Okazaki (JP); Yuji Hayashi, Nukata-gun (JP); Tsuyoshi Yamashita, Anjo (JP)

(73) Assignees: Denso Corporation, Kariya (JP); Nippon Soken, Inc., Nishia (JP)

( * ) Notice: Subject to any disclaimer, the term of this patent is extended or adjusted under 35 U.S.C. 154(b) by 157 days.

(21) Appl. No.: 11/294,427

(22) Filed: Dec. 6, 2005

(65) Prior Publication Data

US 2006/0120114 A1 Jun. 8, 2006

(30) Foreign Application Priority Data

Dec. 6, 2004 (JP) ............. 2004-352664

(51) Int. Cl.
*H02M 3/335* (2006.01)
(52) U.S. Cl. ............. 363/16; 363/41; 363/131
(58) Field of Classification Search ............ 363/15–20, 363/21.12, 21.7, 40, 55, 97, 95; 323/222, 323/272
See application file for complete search history.

(56) References Cited

U.S. PATENT DOCUMENTS

| | | | |
|---|---|---|---|
| 3,735,235 A * | 5/1973 | Hamilton et al. ............. 363/26 |
| 3,909,700 A * | 9/1975 | Ferro ............. 363/147 |
| 5,291,382 A | 3/1994 | Cohen | |
| 5,448,465 A | 9/1995 | Yoshida et al. | |
| 5,870,299 A * | 2/1999 | Rozman ............. 363/127 |
| 5,872,705 A * | 2/1999 | Loftus et al. ............. 363/21.06 |
| 6,128,206 A * | 10/2000 | Sun et al. ............. 363/127 |
| 6,304,460 B1 | 10/2001 | Cuk | |
| 6,400,579 B2 | 6/2002 | Cuk | |
| 6,462,962 B1 | 10/2002 | Cuk | |

FOREIGN PATENT DOCUMENTS

| | | |
|---|---|---|
| JP | A 5-276751 | 10/1993 |
| JP | B2 3175388 | 4/2001 |
| JP | A 2003-79142 | 3/2003 |
| JP | A 2003-102175 | 4/2003 |
| WO | WO 01/73931 A1 | 10/2001 |
| WO | WO 01/86792 A1 | 11/2001 |
| WO | WO 02/21672 A1 | 3/2002 |

* cited by examiner

*Primary Examiner*—Rajnikant B. Patel
(74) *Attorney, Agent, or Firm*—Oliff & Berridge, PLC

(57) ABSTRACT

In a DC to DC converter, a transformer circuit includes a primary winding and a secondary winding member composed of series-connected first to fourth secondary windings having one and the other ends. The one and the other ends of the series-connected first to fourth secondary windings are connected to a first output terminal. The first and second secondary windings are wound around a first magnetic path in opposite directions, and the third and fourth secondary windings are wound around a second magnetic path in opposite directions. A first rectifying element is connected between the second output terminal and a connection point between the first and second secondary windings. A second rectifying element is connected between the second output terminal and a connection point between the third and fourth secondary windings.

8 Claims, 7 Drawing Sheets

INPUT TO OUTPUT ISOLATED DC-DC CONVERTER

CROSS REFERENCE TO RELATED APPLICATION

This application is based upon and claims the benefit of priority of the prior Japanese Patent Application 2004-352664 filed on Dec. 6, 2004 so that the contents of which are incorporated herein by reference.

BACKGROUND OF THE INVENTION

1. Field of the Invention

The present invention relates to an input to output isolated DC (direct current) to DC converter.

2. Description of the Related Art

Input/output isolated DC to DC converters each with a transformer are capable of isolating between input and output thereof, and they have been widely used. Some DC to DC converters each with a transformer whose secondary coil consists of two secondary windings are disclosed in the following publications:

(1) U.S. Pat. No. 5,291,382 corresponding to JP Unexamined Patent Publication No. H5-276751;
(2) U.S. Pat. No. 3,175,388 corresponding to JP Patent Publication No. 3175388;
(3) JP Unexamined Patent Publication No. 2003-79142;
(4) U.S. Pat. No. 6,400,579 corresponding to National Publication of Translated Vernon No. 2003-529311;
(5) U.S. Pat. No. 6,304,460 corresponding to National Publication of Translated Version No. 2003-533163;
(6) U.S. Pat. No. 6,462,962 corresponding to National Publication of Translated Version No. 2004-508799;
(7) JP Unexamined Patent Publication No. 2003-102175; and
(8) U.S. Pat. No. 5,291,382

In these publications, note that a type of secondary coils consisting of one secondary winding with several tappings is included in the type of secondary coils each with two secondary windings.

A full-wave rectifier with two rectifying elements is preferably used as a secondary rectifier in such types of DC to DC converters. The full-wave rectifier converts an AC (Alternating Current) voltage induced across the secondary coil into a DC voltage using both half cycles of the AC voltage, thereby delivering it as a secondary current toward an electrical load.

Specifically, the full-wave rectifier uses two rectifying elements of which one conducts during one half cycle while the other conducts during the other half cycle of the induced AC voltage.

The DC to DC converters, the transformer of each of which is provided with two secondary windings, have an advantage that allows, when one of the different rectifying elements converts the AC voltage induced across one of the two secondary windings into the DC voltage during one half cycle, the other of the different rectifying elements to serve as a choke coil. This permits current ripples and losses caused thereby to decrease.

In addition, there is disclosed a DC to DC converter with one transformer and a full-wave rectifier with different rectifying elements; a single core of this transformer is wound with two secondary windings in the same direction. One of the rectifying elements converts an AC voltage induced across one of the secondary windings into a DC voltage during one half cycle of the AC voltage; the other of the rectifying elements converts the AC voltage induced across the other of the two secondary windings into a DC voltage during the other half cycle thereof.

The secondary coil and the readying elements of a transformer of such a DC to DC converter set forth above are configured to alternately generate and output a secondary current toward an electrical load during one half cycle of an input AC voltage, and a secondary current to the electrical load during the other half cycle of the input AC voltage.

This structure of the DC to DC converter may cause significant change in curt at each of the secondary windings and wires leading from the output terminal thereof to the electrical load during a period around which one and the other half cycles are switched; this period is referred to as a switching transient period.

This means that high frequency current components may flow through and out of the wires during the switching transient period, so that significant electromagnetic waves may be generated from the wires. The significant electromagnetic wave generation may become a major issue for step-down converters.

The high frequency current components flowing through the wires during the switching transient period may generate wasted capacitive leak currents and/or inductive surge voltages through AC impedance components in the secondary circuit portion of the transformer.

SUMMARY OF THE INVENTION

The present invention is made on the background.

Accordingly, at least one preferable embodiment of the present invention provides an input-output isolated DC to DC converter capable of reducing high frequency current components flow through wires leading from secondary windings.

According to one aspect of the present invention, there is provided a DC to DC converter for converting a DC input power into a DC output power through first and second output. The DC to DC converter includes an inverter circuit configured to convert the DC input power into an AC power. The DC to DC converter also includes a transformer circuit. The transformer circuit includes a primary winding and a secondary winding member and configured to convert the AC power applied to the primary winding from the inverter circuit into an output power. The secondary winding member is composed of a first secondary winding, a second secondary winding, a third secondary winding, and a fourth secondary winding. The first to fourth secondary windings are connected in series. The series-connected first to fourth secondary windings have one and the other ends, the one and the other ends of the series-connected first to fourth secondary windings are connected to the first output terminal. The first and second secondary windings are wound around a first magnetic path in opposite directions so as to be electromagnetically coupled to the primary winding. The third and fourth secondary windings are wound around a second magnetic path in opposite directions so as to be electromagnetically coupled to the primary winding. The DC to DC converter further includes a first rectifying element connected between the second output terminal and a connection point between the first and second secondary windings, and a second rectifying element connected between the second output terminal and a connection point between the third and fourth secondary windings.

BRIEF DESCRIPTION OF THE DRAWINGS

Other objects and aspects of the invention will become apparent from the following description of embodiments with reference to the accompanying drawings in which.

DETAILED DESCRIPTION OF EMBODIMENTS OF THE INVENTION

Figure 1:
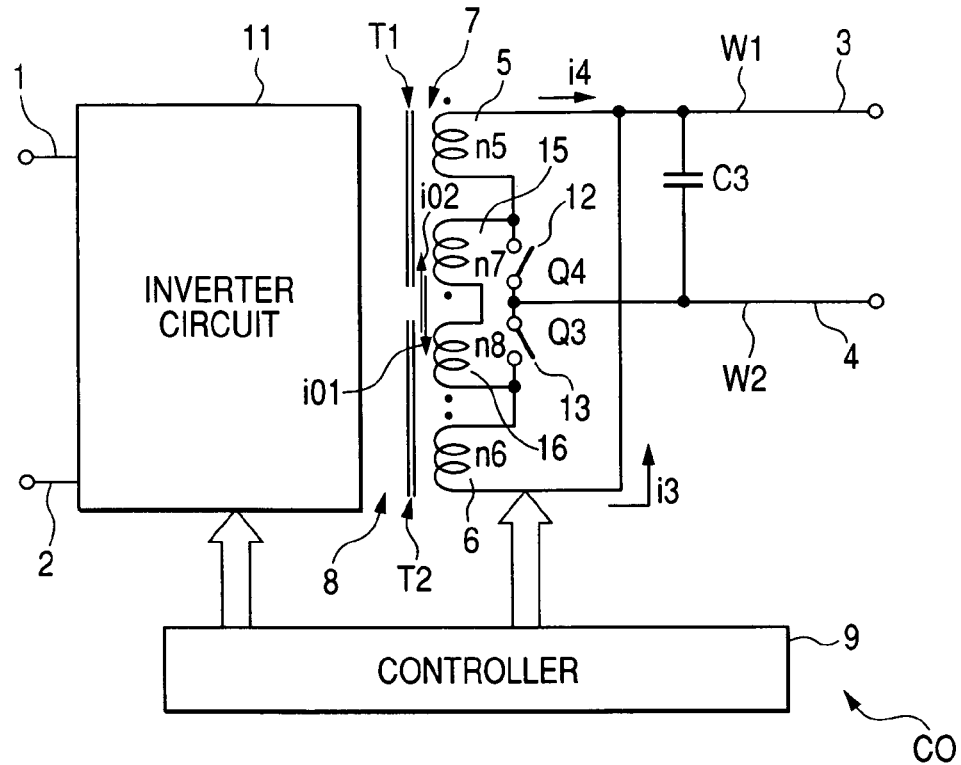
FIG. 1 is a circuit diagram illustrating an overall structure of an input to output isolated DC to DC converter according to a first embodiment of the present invention.

Embodiments and modifications of input to output isolated DC to DC converts according to the present invention will be described hereinafter with reference to the accompanying drawings.

First Embodiment

Overall Structure

The overall structure of an input to output isolated DC to DC converter according to a first embodiment of the present will be described in accordance with FIG. 1.

The DC to DC converter CO is provided with a pair of primary terminals 1 and 2, and a pair of secondary terminals 3 and 4. The DC to DC converter CO allows DC voltage transfer to external devices through the primary terminals 1 and 2 and the secondary terminals 3 and 4.

The DC to DC converter CO is also provided with a pair of first and second transformers 7 and 8. The first transformer 7 is composed of a core T1, preferably with a gap, including a magnetic path, at least one first primary winding (not shown), and a first original secondary winding 5. The first primary winding and the first original secondary winding 5 are wound around the core T1 such that they are electromagnetically coupled to each other.

In addition, the first original secondary winding 5 is wound around the core T1 in a predetermined winding diction indicated by a dot mark illustrated adjacent to the first original secondary winding 5 in FIG. 1. The dot mark represents the polarity of the first original secondary winding 5.

One end (dot-end) of the first original secondary winding 5 is connected to one of the secondary this 3 and 4 through One of wires W1 and W2. In the first embodiment, the dot-end of the fist original secondary winding 5 is connected to the secondary terminal 3 through the wire W1.

Similarly, the second transformer 8 is composed of a core T2, preferably with a gap, including a magnetic path, at least one second primary winding (not shown), and a second original secondary winding 6. The second primary winding and the second original secondary winding 6 are wound around the core T2 such that they are electromagnetically coupled to each other.

In addition, the second original secondary winding 6 is wound around the core T2 in a predetermined winding direction indicated by a dot mark illustrated adjacent to the second original secondary winding 6 in FIG. 1. The dot mark represents the polarity of the second original secondary winding 6.

One end (non-dot end) of the second original secondary winding 6 is connected to one of the secondary terminals 3 and 4 through one of the wires W1 and W2. In the first embodiment, the non-dot end of the second original secondary winding 6 is connected to the secondary terminal 3 through the wire W1.

The DC to DC converter CO is further provided with a controller 9 and an invert circuit 11 connected to the primary terminals 1.

The inverter circuit 11 includes, for example, four switching elements, such as MOS transistors, in full-bridge configuration. Each of the switching elements has a control terminal connected to the controller so that the controller allows turning on and off of each of the switching elements.

Specifically, the controller for example generates a PWM (Pulse Width Modulation) signal, which consists of a train of pulses of high and low voltage levels at predetermined time intervals (periods) with a predetermined reference duty in each period, based on a carrier signal with a predetermined carrier frequency. The controller also outputs the PWM signal to each of the switching elements of the inverter circuit to individually turn it on and off based on the corresponding duty, thereby converting a DC voltage applied from the primary terminals 1 and 2 into an AC voltage. The converted AC voltage is applied to the first and second primary windings of each of the first and second transformers 7 and 8.

In addition, the DC to DC converter CO is provided with a pair of first and second additional secondary windings 15 and 16.

The first additional secondary winding 15 is wound around the same core T1 of the first transformer 7 separately from the first original secondary winding 5 such that the fist primary winding is electromagnetically coupled to the first additional secondary winding 15 and that the winding directions of the first original and additional secondary windings 5 and 15 are reversed from each other. The dot, mark illustrated adjacent to the fist additional secondary winding 15 represents the polarity thereof.

Specially, one end (non-dot end) of the first additional secondary winding 15 is connected to the other end (non-dot end) of the fist original secondary winding 5.

Similarly, the second additional secondary winding 16 is wound around the same core T2 of the second transformer 8 separately from the second original secondary winding 6 such that the second primary winding is electromagnetically coupled to the second additional secondary winding 16 and that the winding directions of the second original and additional secondary windings 6 and 16 are revered from each other.

Specifically, one end (dot-end) of the second additional secondary winding 16 is connected to the other end (dot-end) of the second ordinal secondary winding 6, and the other end (non-dot end) of the second additional secondary winding 16 is connected to the other end (dot-end) of the first additional secondary winding 15.

As clearly illustrated in FIG. 1, the polarity of the first original secondary winding 5 and that of the first additional secondary winding 15 are opposite to each other, and similarly, the polarity of the second original secondary winding 6 and that of the second additional secondary winding 16 are opposite to each other.

In the first embodiment, note that the number of turns of each of the first and second original secondary windings and the number of turns of each of the first and second additional secondary windings are substantially equal to each other. In addition, note that the magnetic resistance of each of the first and second original secondary windings and that of each of the first and second additional secondary windings are substantial equal to each other.

Moreover, the DC to DC converter CO is provided with a pair of switching elements 12 and 13 corresponding, for example, fist and second rectifying elements according to the present invention, and a secondary smoothing capacitor C3 connected between the wires W1 and W2. Specifically, in the first embodiment, the switching elements (first and second rectifying elements) 12 and 13 serve as a synchronous rectifying circuit.

The connection point between the other end (non-dot end) of the first original secondary winding 5 and the one end (non-dot end) of the first additional secondary winding 15 is connected to the other of the wires W1 and W2 through the switching element 12.

Similarly, the connection point between the other end (dot-end) of the second original secondary winding 6 and the one end (dot-end) of the second additional secondary winding 16 is connected to the other of the other of the wires W1 and W2 through the switching element 13.

The switching elements 12 and 13 are connected to each other in series, and the connection point therebetween is connected to the other of the wires W1 and W2 so that the other ends of the first and second original secondary windings 5 and 6 are connected to the other of the secondary terminals 3 and 4 through the switching elements 12 and 13, respectively.

Each of the switching elements 12 and 13 has a control terminal connected to the controller 9. Specifically, the controller 9 generates and outputs a PWM signal with a predetermined duty to each of the switching elements 12 and 13 to individually turn it on and off based on the corresponding duty in synchronization with the turning on and off of the switching elements of the inverter circuit 11.

Specifically, the AC voltage applied to each of the first and second transformers 7 and 8 induces an AC voltage in each of the first original and additional secondary windings 5 and 15 and the second original and additional secondary windings 6 and 16. The alternate turning on and off of the switching elements 12 and 13 based on the control of the controller 9 allow:

the AC voltage induced across the fist origin secondary winding 5 to be converted into a DC voltage; and the AC voltage induced across the second original secondary winding 6 to be converted into a DC voltage.

The alternately converted DC voltages are alternately applied to the smoothing capacitor C3 as DC currents (DC load currents) through the wires W1 and W2. The DC load currents are alternately smoothed by the smoothing capacitor C3 to be alternately outputted to the secondary terminals 3 and 4 through the wires W1 and W2.

In the first embodiment, the primary terminals 1 and 2 are preferably connected to a primary DC power source (battery) for applying a DC voltage thereto, and the secondary terminals 3 and 4 are connected to an electrical load that requires a DC voltage lower than the DC voltage applied from the DC power source. A secondary DC power source for supplying a DC voltage lower than the DC voltage applied from the DC power source can be connected to the secondary terminals 3 and 4 in parallel to the electrical load.

The first and second original secondary windings 5 and 6 will be also referred to as secondary windings n5 and n6, respectively, and the first and second additional secondary windings 15 and 16 will also be referred to as secondary windings n7 and n8, respectively. In addition, the switching elements 12 and 13 will be also referred to as switching elements Q4 and Q3, respectively.

DESCRIPTION OF COMPARATIVE EXAMPLE

Figure 2:
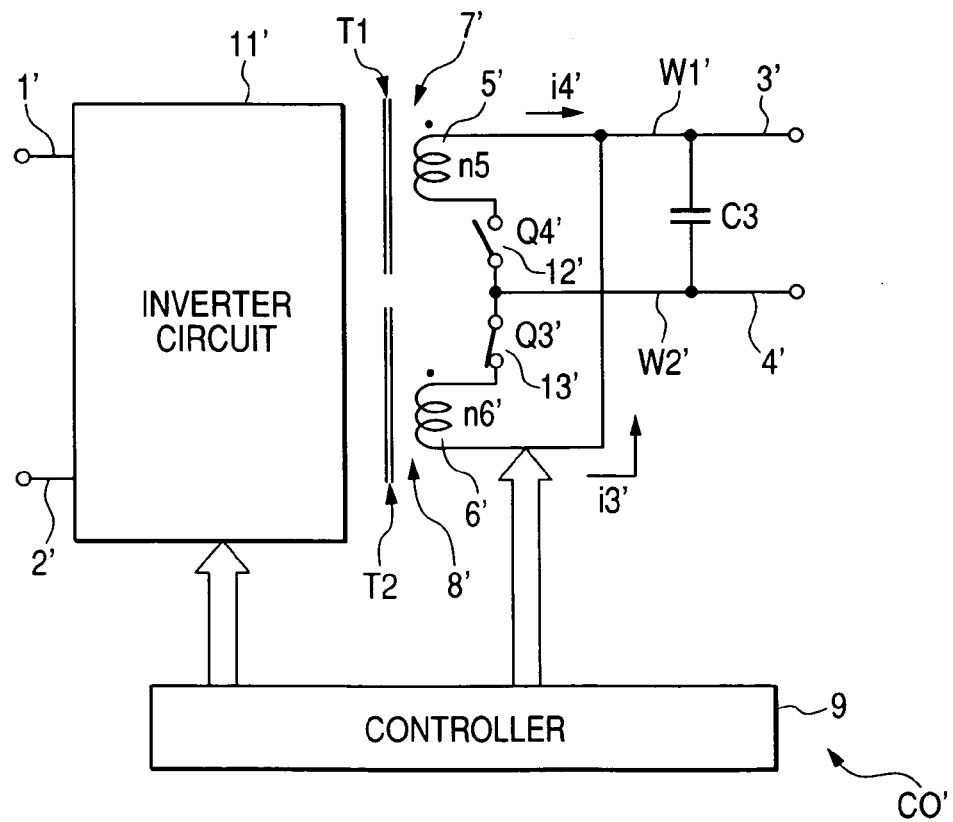
FIG. 2 is a circuit diagram illustrating an overall structure of an input to output isolated DC to DC converter according to a comparative example of the first embodiment of the present invention.

On the other hand, as a comparative example, an input to output isolated DC to DC converter CO' whose structure has a substantially the same as the structure of the DC to DC converter CO except for having the first and second additional secondary windings 15 and 16 is illustrated in FIG. 2. Specifically, in FIG. 2, elements of the isolated DC to DC converter CO' to which reference characters each with dash (') are assigned correspond to the elements of the isolated DC to DC converter CO illustrated in FIG. 1 to which reference characters each with no dash (') are assigned.

Description of Operation

Next, operations of the DC to DC converter CO according to the first embodiment will be described hereinafter while focusing on the difference points between the first embodiment and the comparison example.

Note that, in the fist embodiment, leakage inductances of the first and second transformers 7 and 8 will be almost negligible.

While the switching element 12 is in on state whereas the switching element 13 is in off state in a positive half cycle of the AC voltage applied to each of the first and second transformers 7 and 8 from the inverter circuit 11, the voltage induced across the first original secondary winding 5 allows a secondary DC current i4 to flow out of the dot-end thereof to the secondary terminal 3 through the wire W1 as a load current.

During the positive half cycle of the AC voltage, the voltage induced across the first additional secondary winding n7 allows a secondary DC current io1 to flow out of the dot-end thereof through the second additional secondary winding n& and the second original secondary winding n6 in this order. The secondary DC current i01 flows out to the secondary terminal 3 through the wire W1 as a load current.

The magnitude M4 of the load current i4 and the magnitude M01 of the load current i01 are substantially equal to each other.

In the first embodiment, the winding directions of the second additional secondary winding n8 and the second original secondary winding n6 are reversed from each other, in other words, the polarity of the secondary winding n8 and that of the secondary winding n6 are opposite to each other. For these reasons, an electromagnetic force created across the second additional secondary winding n8 and that created across the second original secondary winding n6 based on magnetic flux set up by the current io1 are shifted from each other in phase by 180 degrees.

This 180 degrees out-of-phase between the created electromagnetic forces across the secondary windings n8 and n6 allows the created electromagnetic forces thereacross to balance each other out Especially, in the first embodiment, the number of turns and the magnetic resistance of the secondary windings n8 and those of the secondary windings n6 are substantially equal to each other, so that the electromagnetic force created across the second additional secondary winding n8 is substantially identical with that of the second original secondary winding n6. This permits the created electromagnetic forces across the secondary windings n8 and n6 to be cancelled out against each other. Specifically, this cancel is substantial equivalent to a short-circuit in the secondary windings n8 and n6.

After the positive half cycle, the switching element 12 is turned off, and the switching element 13 is turned on. While the switching element 12 is in off state whereas the switching element 13 is in on state in the negative half cycle of the AC voltage, the voltage induced across the second original secondary winding 6 allows a secondary DC current i3 to flow out of the non-dot end thereof to the secondary terminal 3 trough the wire W1 as a load current.

During the negative half cycle of the AC voltage, the voltage induced across the second additional secondary winding n8 allows a secondary current io2 to flow out of the non-dot end thereof through the first additional secondary winding n7 and the first original secondary winding n5 in this order. The secondary current io2 flows out to the secondary terminal 3 as a load current through the wire W1.

The magnitude M3 of the load current i3 and the magnitude M02 of the secondary DC current io2 are substantially equal to each other.

In the first embodiment, the winding directions of the first additional secondary winding n7 and the first original secondary winding n5 are reversed from each other, in other words, the polarity of the secondary winding n7 and that of the secondary winding n5 are opposite to each other. For these reasons, an electromagnetic force created across the first additional secondary winding n7 and that created across the first original secondary winding n5 based on magnetic field set up by the current io2 are shifted from each other in phase by 180 degrees.

This 180 degrees out-of-phase between the created electromagnetic forces across the secondary windings n7 and n5 allows the created electromagnetic forces across the secondary windings n7 and n5 to balance each other out.

Especially, in the first embodiment, the number of turns and the magnetic resistance of the secondary windings n7 and those of the secondary windings n5 are substantially equal to each other, so that the electromagnetic force created across the first additional secondary winding n7 is substantially identical with that of the first original secondary winding n5. This allows the created electromagnetic forces across the secondary windings n7 and n5 to be cancelled out against each other. Specifically, this cancel is substantial equivalent to a short-circuit in the secondary windings n7 and n5.

In contrast, in the DC to DC converter CO' illustrated in FIG. 2, while the switching element 12' is in on state whereas the switching element 13' is in off state in one positive half cycle of the AC voltage applied to each of the first and second transformers 7' and 8' from the inverter circuit 11', the voltage induced across the secondary winding 5' allows a secondary DC current i4' to flow out of the dot-end thereof to the secondary terminal 3' through the wire W1' as a load current.

In the DC to DC converter CO', during a positive half cycle of the AC voltage, because no secondary current flows through the secondary winding n6' of the second transformer 8', the magnitude M4' of the secondary current i4' is substantially the double of the magnitude M4 of the secondary current i4. For the same reason, when the switching element 12 is turned off after the positive half cycle of the AC voltage induced across the first original secondary element 5, the secondary current i4' becomes zero in an extremely brief period of time (see the reference character "b" in FIG. 6 shown hereinafter).

Similarly, during the negative half cycle of the AC voltage, while the switching element 12' is in off state whereas the switching element 13' is in on state, the voltage induced across the second winding 6' allows a secondary DC current i3' to flow out of the dot-end thereof to the secondary terminal 3' trough the wire W1' as a load current.

In contrast, no secondary current flows through the secondary winding n5' of the first transformer 7'. For this reason, the magnitude M3', of the secondary current i3' is substantially the double of the magnitude M3 of the secondary current i3. For the sane reason, when the switching element 13' is turned off after the negative half cycle of the AC voltage, the secondary current i3' becomes zero in an extremely brief period of time (see the reference character "b" in FIG. 6 shown hereinafter).

Figure 6:
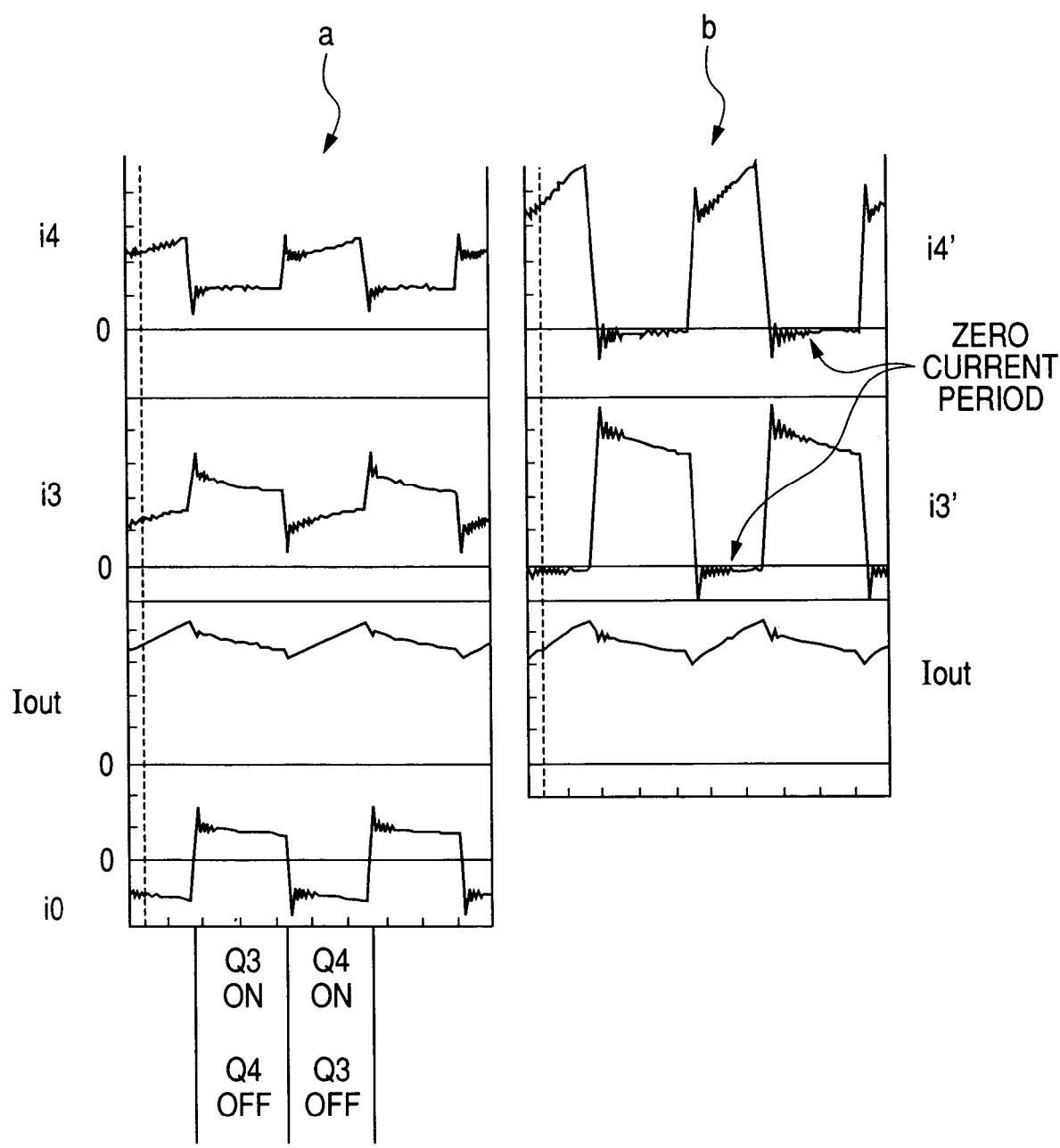
FIG. 6 is a graph schematically illustrating waveforms of the currents i4, i3, and Iout obtained by the DC to DC converter according to the third embodiment and those of the currents i4', i3' and iout' obtained by a DC to DC converter according to the comparative example.

Specifically, in the DC to DC converter CO' according to the comparative example (see FIG. 2), the magnitude of the secondary current (load current) i4' (i3') periodically varies over time between the maximum value M4' (M3') and the minimum value of zero during a switching transient period around which the positive half cycle and the negative half cycle are switched (see FIG. 6).

In contrast, in the DC to DC converter CO according to the first embodiment (see FIG. 1), the magnitude of the secondary current (load current) i4 (i3) periodically varies over time between the maximum value M4 (M3) and the minimum value M01 (M02) during the switching transient period.

As clearly understood by comparison of the waveform of the load current i4 (i3) during the switching transient period with that of the load current i4' (i3') thereduring, assuming that the sum of the load currents i4 and i3 in magnitude is substantially equal to that of the load currents i4' and i3' in magnitude, the variation in the load current i4 (i3) is very smaller than that in the load current i4' (i3'). As compared with the DC to DC converter CO' illustrated in FIG. 2, this makes it possible to reduce:

electromagnetic waves generated from the wires W1 and W2 of the DC to DC converter CO; and the impact of the variation in the load current i4 (i3) on AC impedance components (capacitances and/or inductances) of the secondary windings 5, 15, 16, and 6 and/or the wires W1 and W2, thereby reducing leak currents and/or inductive surge voltages through the AC impedance components.

In addition, in the DC to DC converter CO' the magnitude of the secondary current (goad current) i4' (i3') flowing through the secondary winding n5' (n6') is substantially twice that of the secondary current goad current) i4 (i3) flowing through the secondary winding n5 (n6).

In contrast, in the DC to DC converter CO, the secondary current (load current) branches so that one of which flows through the secondary winding n5 (n6) of one of the first and second transformers 7 and 8, whereas the other of which flows through the secondary windings n8, n6 (n7, n5) while having electromagnetically little effect on the other of the transformers 7 and 8.

The DC to DC converter CO therefore causes the secondary current to be split into the separated secondary current flows i4 (i3) and i01 (i02) so that the separated secondary current flows i4 (i3) and i01 (i02) are drawn by the load through both the secondary windings of the first transformer 7 and those of the second transformer 8. As compared with the DC to DC converter CO', the DC to DC converter CO permits the magnitude of the secondary current flowing through each of the first and second transformers 7 and 8 to be cut in half.

Because copper loss (winding loss) of each of the first and second transformers 7 and 8 is in proportion to the magnitude of the secondary current flowing therethrough, it is possible to reduce the copper loss of each of the first and second transformers 7 and 8 of the DC to DC converter CO as compared with those of each of the first and second transformers 7' and 8' of the DC to DC converter CO'.

More particularly, when the total volume of copper from which the secondary windings 7, 8, 15, and 16 are made and that of copper from which the secondary windings 7' and 8' are made are substantially equal to each other, the lateral cross-sectional area of each of the secondary windings 7' and 8' is two times as much as that of each of the secondary windings 7, 8, 15, and 16. For this reason, it is possible to further reduce the copper loss of each of the secondary windings 7, 8, 15, and 16 more than that of each of the secondary windings 7' and 8'.

In addition, in the first embodiment, because radiation noises from the secondary windings pass through the cores T1 and T2 to be absorbed therein, it is possible to reduce the radiation noises.

Second Embodiment

Overall Structure

The overall structure of an input to output isolated DC to DC converter CO1 according to a second embodiment of the present will be described in accordance with FIG. 3.

Figure 3:
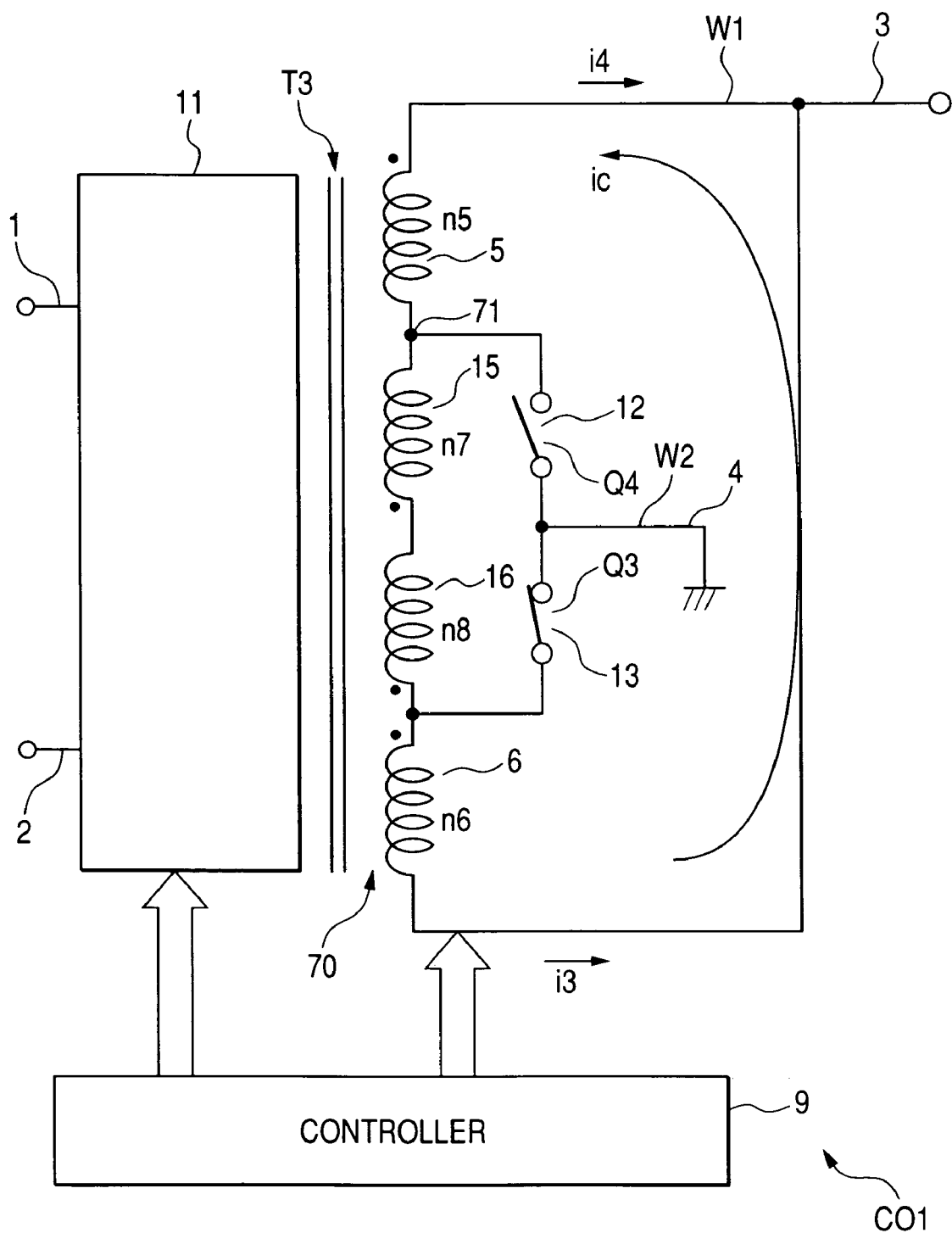
FIG. 3 is a circuit diagram illustrating an overall structure of an input to output isolated DC to DC converter according to a second embodiment of the present invention.

The DC to DC converter CO1 illustrated in FIG. 3 is provided with a singe transformer 70 in place of the first and second transformers 7 and 8. Note that other elements of the DC to DC converter CO1 according to the second embodiment, which are substantially identical to hose of the DC to DC converter CO according to the first embodiment, are represented by the same reference charmers as in FIG. 1, and therefore, descriptions of the other elements of the DC to DC converter CO1 according to the second embodiment are omitted or simplified.

Specifically, the transformer 70 is composed of a core T3, preferably with a gap, constituting a magnetic path, at least one primary winding (not shown), and a pair of first and second original secondary windings 5 and 6 (n5 and n6). The primary winding and each of the first and second original secondary windings 5 and 6 are wound around the core T3 such that they arc electromagnetically coupled to each other.

In addition, the first original secondary winding 5 is wound around the core T3 in a predetermined winding direction illustrated in a dot mark in FIG. 3. Similarly, the second original secondary winding 6 is wound around the core T3 in a predetermined winding direction illustrated in a dot mark in FIG. 3.

Moreover, the DC to DC converter CO1 is provided with a pair of first and second additional secondary windings 15 (n7) and 16 (n8).

The first additional secondary winding 15 is wound around the same core T3 of the transformer 70 separately from the first original secondary winding 5 such that the primary winding is electromagnetically coupled to the first additional secondary winding 15 and that the winding directions of the first original and additional secondary windings 5 and 15 are reversed from each other. The dot mark represents the polarity of the first additional secondary winding 15.

One end (non-dot end) of the first additional secondary winding 15 is connected to the other end (non-dot end) of the first original secondary winding 5 through a first tapping 71.

Similarly, the second additional secondary winding 16 is wound around the same core T3 of the transformer 70 separately from the second original secondary winding 6 such that the second primary winding is electromagnetically coupled to the second additional secondary winding 16 and that the winding directions of the second original and additional secondary windings 6 and 16 are reversed from each other.

One end (dot-end) of the second additional secondary winding 16 is connected to the other end (dot-end) of the second ordinal secondary winding 6 through a second tapping 72, and the other end (non-dot end) of the second additional secondary winding 16 is connected to the other end (dot-end) of the first additional secondary winding 15.

Specifically, in the second embodiment, the first and second original secondary windings 5 and 6, and the first and second additional secondary windings 15 and 16 are wound around the same core (same magnetic path) T3, and connected to each other in series.

Like the first embodiment, in the second embodiment, note that the number of turns of each of the first and second original secondary windings and the number of turns of each of the first and second additional secondary winding are substantial equal to each other. In addition, note that the magnetic resistance of each of the first and second original secondary windings and that of each of the first and second additional secondary windings are substantially equal to each other.

Furthermore, the DC to DC converter CO1 is provided with a pair of swing elements 12 and 13.

The first tapping 71 between the other end (non-dot end) of the first original secondary winding 5 and the one end (non-dot end) of the first additional secondary winding 15 is connected to the secondary terminal 4 trough the switching element 12; this secondary terminal 4 is grounded.

Similarly, the second tapping 72 between the other end (dot-end) of the second original secondary winding 6 and the one end (dot-end) of the second additional secondary winding 16 is connected to the secondary terminal 4.

The first and second switches 12 and 13 are connected to each other in series and the connection point therebetween is connected to the secondary terminal 4.

Description of Operation

Next, operations of the DC to DC converter CO1 according to the second embodiment will be described hereinafter.

Note that, in the second embodiment, leakage inductance of the transformer 70 wilt be almost negligible.

While the switching element 12 is in on state whereas the switching element 13 is in off state in a positive half cycle of the AC voltage applied to the transformer 70 from the inverter circuit 11, the voltage induced across the first original secondary winding 5 allows a secondary DC current i4 to flow out of the dot-end thereof to the secondary terminal 3 through the wire W1 as a load current.

During the positive half cycle of the AC voltage, the voltage induced across the first additional secondary winding n7 allows a secondary DC current io1 to flow out of the dot-end thereof through the second additional secondary winding n8 and the second original secondary winding n6 in this order, thereby flowing out to the secondary terminal 3 through the wire W1 as a load current.

Like the first embodiment, an electromagnetic force induced across the second additional secondary winding n8 and that induced across the second original secondary winding n6 based on magnetic field set up by the current io1 are shifted from each other in phase by 180 degrees.

This 180 degrees out-of-phase between the induced electromagnetic forces across the secondary windings n8 and n6 allows the created electromagnetic forces across the secondary windings n8 arid n6 to cancelled out against each other.

After the positive half cycle, the switching element 12 is turned off, and the switching element 13 is turned on. While the switching element 12 is in off state whereas the switching element 13 is in on state in the negative half cycle of the AC voltage, the voltage induced across the second original secondary winding 6 allows a secondary DC current i3 to flow out of the non-dot end thereof to the secondary terminal 3 trough the we W1 as a load rent.

During the negative half cycle of the AC voltage, the voltage induced across the second additional secondary winding n8 allows a secondary current io2 to flow out of the non-dot end thereof through the first additional secondary winding n7 and the first original secondary winding n5 in this order, thereby flowing out to the secondary terminal 3 as a load current through the wire W1.

As with the first embodiment, an electromagnetic force created across the first additional secondary winding n7 and that created across the first original secondary winding n5 based on a magnetic field set up by the current io2 are shifted from each other in phase by 180 degrees.

This 180 degrees out-of-phase between the created electromagnetic forces across the secondary windings n7 and n5 allows the created electromagnetic forces across the secondary windings n7 and n5 to be cancelled out against each other.

Note that, in the second embodiment, the first and second original secondary windings 5 and 6, and the first and second additional secondary windings 15 and 16 are connected to each other in series so that they short-circuit to one another. This allows cyclic currents to flow through the secondary windings 5, 6, 15, and 16 if the electromagnetic forces induced across the secondary windings 5, 6, 15, and 16 are unbalanced. In order to avoid the occurrence of the cyclic currents, it is preferably necessary to produce and/or arrange the secondary windings 5, 6, 15, and 16 so that the sum of the electromagnetic forces induced across the secondary windings 5, 6, 15, and 16 is brought to approximately zero. Even if the Sum of the electromagnetic forces induced across the secondary windings 5, 6, 15, and 16 do not become zero, leakage inductances of the secondary windings 5, 6, 15, and 16 can reduce the cyclic cults. Moreover, for reducing the cyclic currents, one or more choke coils can be connected to the short-circuit path through which the cyclic currents flow.

As described above, in the second embodiment, like the first embodiment, as compared with the DC to DC converter CO' shown in FIG. 2, it is possible to reduce:

electromagnetic waves generated from the wires W1 and W2 of the DC to DC converter CO1, and the impact of the variation in the load current i4 (i3) on AC impedance components (capacitances and/or inductances) of the secondary windings 5, 15, 16, and 6 and/or the wires W1 and W2, thereby reducing leak currents and/or inductive surge voltages through the AC impedance components.

Third Embodiment

Overall Structure

The overall structure of an input to output isolated DC to DC converter CO2 according to a third embodiment of the present invention will be explained in accordance with FIGS. 4 to 6.

The DC to DC converter CO2 according to the third embodiment is configured to a step-down DC to DC converter. In FIG. 4, specific examples of an inverter circuit 11A, a first transformer 7A, and a second transformer 8A are illustrated. The other elements of the DC to DC converter CO2 according to the third embodiment are substantially identical to those of the DC to DC converter CO according to the first embodiment so that they are represented by the same reference characters as in FIG. 1, and therefore, descriptions of the other elements of the DC to DC converter CO2 according to the third embodiment are omitted or simplified.

Specifically, the DC to DC converter CO2 is provided with a pair of primary terminals 1 and 2, a pair of secondary terminals 3 and 4, a pair of first and second transformers 7A and 8A, a controller 9, an inverter circuit 11A, first and second additional secondary windings 15 and 16, switching elements 12 and 13, and a secondary smoothing capacitor C3.

The first transformer 7A is composed of a core T1, a pair of first primary windings n1 and n3, a first original secondary winding 5 (n5), and a first additional secondary winding 15 (n7). The first primary windings n1 and n3 are wound around the core T1 separately from each other in the same winding directions (see dot marks of the windings n1 and n3), and the first original and additional secondary windings 5 and 15 are wound around the same core T1 separately from each other in the opposite winding directions (see dot marks of the windings 5 and 15).

The first primary winding n1 and the first original secondary winding 5 are electromagnetically coupled to each other. Similarly, the fist primary winding n3 and the first additional secondary winding 15 are electromagnetically coupled to each other.

Similarly, the second transformer 8A is composed of a core T2, a pair of second primary windings n2 and n4, a second original secondary winding 6 (n6), and a second additional secondary winding 16 (n8). The second primary windings n2 and n4 are wound around the core T2 separately from each other in the same winding directions (see dot marks of the windings n2 and n4), and the second original and additional secondary windings 6 and 16 are wound around the same core T2 separately from each other in the opposite winding directions (see dot marks of the windings 6 and 16). Specifically, the winding directions of all of the primary windings n1 to n4 coincide with each other.

The second pray winding n4 and the second original secondary winding 6 are electromagnetically coupled to each other. Similarly, the second primary winding n2 and the second additional secondary winding 16 are electromagnetically coupled to each other.

The inverter circuit 11A includes a main switching element Q1, a sub switching element Q2, and capacitors C1 and C2. The reference numeral 80 in FIG. 4 represents an input DC battery (DC power source), One end (dot end) of the first pray winding n1 is connected to the positive terminal of the battery 80 through a wire 10, and the other end (non-dot end) thereof is connected to one end (dot end) of the second primary winding n2. The other end (non-dot end) of the second primary winding n2 is connected to one end of the second primary winding n4, and the other end (dot end) thereof is connected to one end (non-dot end) of the first primary winding n3.

The other end of the first primary winding n3 is connected to both the capacitors C1 and C2 through wires 30, and the capacitor C1 is connected to the negative terminal of the battery 80 through a wire 20. One terminals of the main and sub switching elements Q1 and Q2 are connected to each other in series, the other terminal of the sub switching clement Q2 is connected to the capacitor C2, and the other terminal of the main switching element Q1 is connected to the negative terminal of the battery 80 through the wire 20. The connecting point between the switching elements Q1 and Q2 is connected to the one end (non-dot end) of the second primary winding n4 through a wire 40.

In the third embodiment, the capacitors C1 and C2, and the main and sub switching elements Q1 and Q2 constitute the inverter circuit 11A.

Each of the main and sub switching elements Q1 and Q2 has a control terminal connected to the controller 9.

In the third embodiment, an output voltage from the DC to DC converter CO2 is detected by a voltage detecting circuit (not shown) so that the detected output voltage is sent to the controller 9 from the voltage detecting circuit The controller 9 generates, based on a difference between the detected output voltage and a target voltage, a PWM signal 6 with a predetermined duty D, and outputs it to each of the main and sub switching elements Q1 and Q2, and to each of the switching elements Q4 (12) and Q3 (13) to individually turn it on and off based on the corresponding duty D.

The switching control of the controller 9 with respect to each of the switching elements Q1 to Q4 allows the output voltage from the DC to DC converter to be regulated to the target voltage.

Note that, in the third embodiment, the carrier frequency on which the PWM signal is generated is, for example, set within a range from several dozens of kilohertz to several hundred thereof The carrier frequency can be set to a highest value that allows increase of losses and electromagnetic noises to be kept to an acceptable level, taking it possible to downsize the DC to DC converter CO2.

For example, as the switching elements Q1 to Q4, MOS transistors are preferably applied, but other switching elements can be used.

In the inverter circuit 11, if dead time is ignored, the main switching element Q1 and the sub switching element Q2 are complementarily turned on and off based on control of the controller 9.

Figure 4:
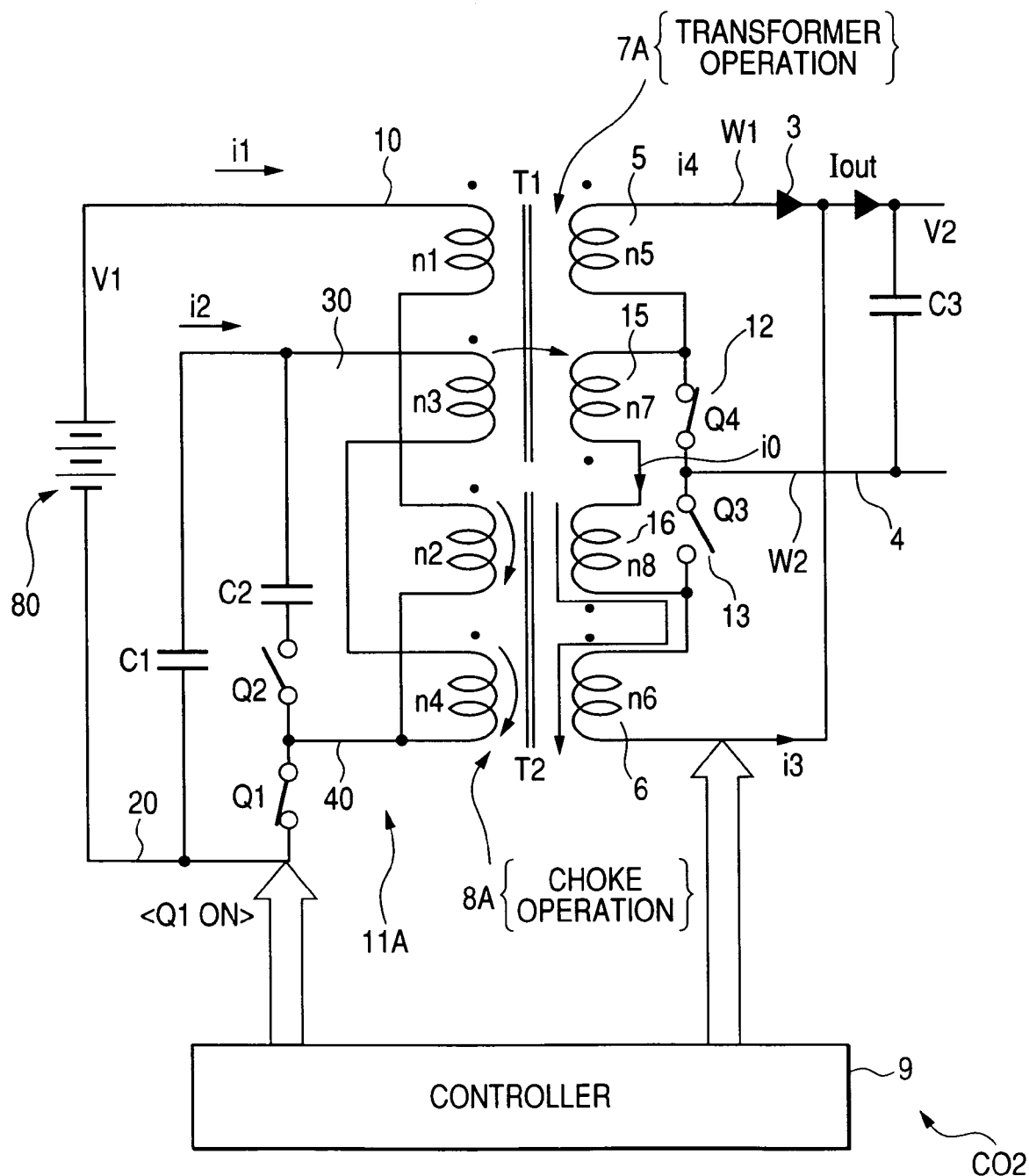
FIG. 4 is a circuit diagram illustrating a state of an input to output isolated DC to DC converter during a first half wave period according to a third embodiment of the present invention.

FIG. 4 shows a state of the converter CO2 in a first half wave period during which the main witching element Q1 and the switching element Q4 are in off state, and the sub switching element Q2 is in on state; FIG. 5 shows another state of the converter CO2 in a second half wave period during which the sub switching element Q2 and the switching element Q3 are in off state, and the main switching element Q1 is in on state. In the third embodiment, for easily describing operations of the converter CO2, the numbers of turns and the magnetic resistances of the windings n1 to n4 are assumed to be substantially equal to each other. In the third embodiment, leakage inductances of the first and second transformers 7A and 8A are assumed to be almost negligible, and dead time between each ON period of the switching element Q1 and that of the sub switching element Q2 is assumed to be almost negligible.

Description of Converter's Operrations During First Half Wave Period

Operations of the converter CO2 during a first half wave period will be described hereinafter with reference to FIG. 4.

Specifically, the on state of the main switching element Q1 and the off state of the main switching element Q2 allow a predetermined DC voltage of the battery 80 to cause a current i1 to flow into the primary windings n1 and n2 from the dot-ends thereof, thereby passing therethrough.

At that time, the capacitor C1 has been charged for a second half wave period prior to this first half wave period so that the charged voltage across the capacitor C1 is higher than the average voltage of the battery 80. This allows the capacitor C1 to discharge a current i2 so that the current i2 flows into the primary windings n3 and n4 from the dot-ends thereof and passes therethrough. Thereafter, the discharged current i2 flows through the man switching element Q1.

Because the current i1 flowing through the primary windings n1 and n2 increases over time, it sets up magnetic flux around each of the primary windings n1 and n2, and the magnitude of the magnetic flux set up around each of the primary windings n1 and n2 corresponds to a predetermined magnetomotive force equal to the product of the total number of turns in each of the primary windings n1 and n2 and the current i1.

Because the current i1 flaws into the primary windings n1 and n2 from the dot-ends thereof, the magnetic flux change set up around each of the primary windings n1 and n2 induces a secondary voltage around each of the first original secondary winding 5 (n5) and the second additional secondary winding 161; this secondary voltage across each of the secondary windings 5 and 16 has the dot-mark indicated positive polarity, and is proportional to the magnitude of the corresponding magnetic flux change.

Similarly, because the current i2 flowing through the primary windings n3 and n4 increases over time, it sets up magnetic flux around each of the primary windings n3 and n4, and the magnitude of the magnetic flux set up around each of the primary windings n3 and n4 corresponds to a predetermined magnetomotive force equal to the product of the total number of turns in each of the primary windings n3 and n4 and the current i2.

Because the current i2 flows into the primary windings n3 and n4 from the dot-ends thereof, the magnetic flux change set up around each of the primary windings n3 and n4 induces a secondary voltage across each of the first additional secondary winding 15 (n7) and the second original secondary winding 6 (n6); this secondary voltage across each of the secondary windings 15 and 6 has the dot-mark indicated positive polarity, and is proportional to the magnitude of the corresponding magnetic flux change.

Because the switching element Q4 is in on state during the first half wave period, the secondary voltage induced across the secondary winding 5 allows a current i4 to flow out of the dot-end of the winding 5 through the wire W1 and the secondary terminal 3.

In contrast, because the switching element Q3 is in off state during the first half wave period, the secondary windings 6 and 16 of the second transformer 8A serve only choke coils.

In addition, the secondary voltage induced across the first additional secondary winding 15 allows a current i01 to flow out of the dot-end of the winding 15 through the second additional secondary winding 16 (n8) and the second original secondary winding 6 (n6) in this order. The current i01 flows out to the secondary terminal 3 through the wire W1 as a load current i3.

In the third embodiment, the winding directions of the second additional secondary winding 16 (n8) and the second original secondary winding 6 (n6) are reversed from each other, in other words, the polarity of the secondary winding 16 and that of the secondary winding 6 are opposite to each other. For these reasons, an electromagnetic force created across the secondary wing 16 and that created across the secondary winding 6 are shifted from each other in phase by 180 degrees.

This 180 degrees out-of-phase between the created electromagnetic forces across the secondary windings 16 and 6 allows the created electromagnetic forces across the secondary windings 16 and 6 to be canceled out against each other.

This allows a secondary current created by the secondary windings 16 and 6 to be brought to approximately zero viewing from the primary side thereof, making the secondary windings 16 and 6 of the second transformer 8A only sere as choke coils.

Description of Converter's Operrations During Second Half Wave Period

Operations of the converter CO2 during the second half wave period will be described hereinafter with reference to FIG. 5.

Specifically, the on state of the sub switching element Q2 and the off state of the main switching element Q1 allow the battery 80 to cause part i21 of the current i1 flowing through the primary windings n1 and n2 during the prior first half wave period to be commutated (bypassed) to the primary windings n4 and n3 from the non-dot ends thereof so that the current i21 passes through the primary windings n4 and n3 to flow into the capacitor C1. The current i21 flowing through the primary windings n4 and n3 into the capacitor C1 excites the primary windings n4 and n3, and charges the capacitor C1.

The remaining part i22 of the current i1 is commutated from the main switching element side to the sub switching element Q2, thereby flowing through the series-connected capacitors C2 and C1 to the negative terminal of the battery 80. This allows the capacitors C2 and C1 to be charged. Specifically, the sum of the currents i21 and i22, which is referred to as current i2 allows the capacitor C1 to be charged. The current i2 is substantially equal to the current i1.

Because the series-connected capacitors C2 and C1 and the battery 80 constitute a series circuit, the more capacitor C1 is charged, the more the current i1 is reduced.

After the capacitor C2 has been fully charged by the commutation current i1 for the first half of the second half wave period, the chard voltage across the capacitor C2 causes a current to flow into the primary windings n4 and n3 from the non dot-ends so that the current passes through the primary windings n4 and n3 to flow out of the dot ends thereof in the direction in which the capacitor C2 is discharged for the latter half of the second half wave period.

Because the current i1 flowing through the primary windings n1 and n2 decreases over time, it sets up magnetic flux around each of the primary windings n1 and n2, and the magnitude of the magnetic flux set up around each of the primary windings n1 and n2 corresponds to a predetermined magnetomotive force equal to the product of the total number of turns in each of the primary windings n1 and n2 and the current i1.

Because the current i1 flows into the primary windings n1 and n2 from the dot-ends thereof, the magnetic flux change set up around each of the primary windings n1 and n2 induces a secondary voltage across each of the first original secondary winding 5 (n5) and the second additional secondary winding 16 (n8); this secondary voltage across each of the secondary windings 5 and 16 has the non-dot mark indicated positive polarity, and is proportional to the magnitude of the corresponding magnetic flux change.

Similarly, because the current i2 flowing through the primary windings n4 and n3 increases over time, it sets up magnetic flux around each of the primary windings n4 and n3, and the magnitude of the magnetic flux set up around of the p a windings n4 and n3 corresponds to a predetermined magnetomotive force equal to the product of the total number of turns in each of the primary windings n4 and n3 and the current i2.

The current i2 flows into the primary windings n4 and n3 from the non-dot ends thereof For this reason, the magnetic flux change set up around each of the primary windings n4 and n3 induces a secondary voltage across each of the first additional secondary winding 6 (n6) and the second original secondary winding 15 (n7); this secondary voltage across the secondary winding 6 has the non-dot mark indicated positive polarity, and this secondary voltage across the secondary winding 15 has the dot-mark indicated positive polarity. The secondary voltage of each of the secondary windings 6 and 15 is proportional to the magnitude of the corresponding magnetic flux change.

Because the switching element Q3 is in on state during the second half wave period, the secondary voltage induced across the secondary winding 6 allows a current is to flow out of the non-dot end of the winding 6 through the wire W1 and the secondary terminal 3.

In contrast, because the switching element Q4 is in off state during the second half wave period, the secondary windings 5 and 15 of the first transformer 7A serve only choke coils.

In addition, the secondary voltage induced across the second additional secondary winding 16 allows a current i02 to flow out of the non-dot end of the winding 16 through the first additional secondary winding 15 (n7) and the fist original secondary winding 5 (n5) in this order. The current i02 flows out to the secondary terminal 3 through the wire W1 as a load current i4.

In the third embodiment, the winding directions of the first additional secondary winding 15 (n7) and the first original secondary winding 5 (n5) are reversed from each other, in other words, the polarity of the secondary winding 15 and that of the secondary winding 5 are opposite to each other. For these reasons, an electromagnetic force created across the secondary winding 15 and that created across the secondary winding 5 are shifted from each other in phase by 180 degrees.

This 180 degrees out-of-phase between the created electromagnetic forces across the secondary windings 15 and 5 allows the created electromagnetic forces across the secondary windings 15 and 5 to be canceled out against each other.

This allows a secondary current created by the secondary windings 15 and 5 to be brought to approximately zero viewing from the primary side thereof, making the secondary windings 15 and 5 of the first transformer 7A only serve as choke coils.

Note that the capacitor C2 and the sub switching element Q2 substantially operate as an active clamp circuit As described above, charge of the capacitor C1 during the second half wave period allows the capacitor C1 to be discharged through the primary windings n3 and n4 during the next first half wave period. Specifically, the inverter circuit 11A causes a DC current to flow through the primary windings n1 and n2 during each of the first and second half wave period, but causes an AC current to flow through the primary windings n3 and n4 such that the current direction of the AC current is reversed between the first half wave period and the second half wave period.

An increase of the duty D of each of the m switching element Q1 and the switching element Q4 contributes to an increase of the current i1 supplied from the battery 80, causing an output current Iout from the DC to DC converter CO2; this output current Iout represents a sum of the currents I3 and I4. The controller 9 is therefore operative to compare the output voltage from the DC to DC converter CO2 corresponding to the output current Iout with the target voltage. Based on the compared result, the controller 9 is operative to:

increase the on duty D of the main switching element Q1 when it is determined that the output voltage is lower tan the target voltage; and decrease the on duty D of the main switching element Q1 when it is determined that the output voltage is higher than the target voltage.

This duty control allows the output voltage from the DC to DC converter CO2 to coincide with the target voltage.

Effects

As set forth above, the inverter circuit 11A of the DC to DC converter CO2 adopts the circuit structure in which the charging and discharging capacitor C1 is connected to the series connected primary windings n1 and n2 in series. This circuit structure permits current ripples contained in the current i2 through the primary windings, that is, AC voltage components, to be reduced. The circuit structure also permits an AC voltage based on the AC cent to be applied to the primary windings n3 and n4 through the capacitor C1 so that an AC voltage is created in the secondary side of the first and second transformers 7A and 8A.

In addition, the circuit structure according to the third embodiment makes it possible to create the rectified DC current (output current iout) based on the AC current components and the DC current component supplied to the primary windings n1 to n4. This can realize the input-output isolated DC to DC converter CO2 whose output current contains low input current ripples. Because the first and second transformers 7A and 8A alternately serve as choke coils, it is unnecessary to provide choke coils at the input side and/or output side of the DC to DC converter CO2.

FIG. 6 shows the waveforms of the currents i4, i3, and Iout obtained by the DC to DC converter CO2, which are indicated by the reference character "d", and those of the currents i4', i3' and iout' obtained by the DC to DC converter CO', which are indicated by the reference character "b"; His current iout' represents the sum of the currents i4' and i3'. In addition, the current i0 indicates the sum of the current i01 flowing through the secondary winding 6 and the current i02 flowing through the secondary winding 5.

As clearly understood by comparison of the waveforms of the load currents i4 and i3 with those of the load currents i4' and i3', the high frequency components contained in the load currents i4 and i3 are extremely reduced compared to those contained in the load currents i4' and i3'.

As described above, in the third embodiment, like the first embodiment, as compared with the DC to DC converter CO' shown in FIG. 2, it is possible to reduce:

electromagnetic waves generated from the wires W1 and W2 of the DC to DC converter CO2, and the impact of the variation in the load current i4 (i3) on AC impedance components (capacitances and/or inductances) of the secondary windings 5, 15, 16, and 6 and/or the wires W1 and W2, thereby reducing leak currents and/or inductive surge voltages through the AC impedance components.

Moreover, in the DC to DC converter CO2 according to the third embodiment, it is possible to sequentially supply the current from the battery 80 to the inverter circuit 11A during the first and second half wave periods. This allows backflow of the current to the battery 80 to be reduced even if a smoothing capacitor(s) and/or a choke coil(s) for reducing the backflow are downed or omitted.

Figure 5:
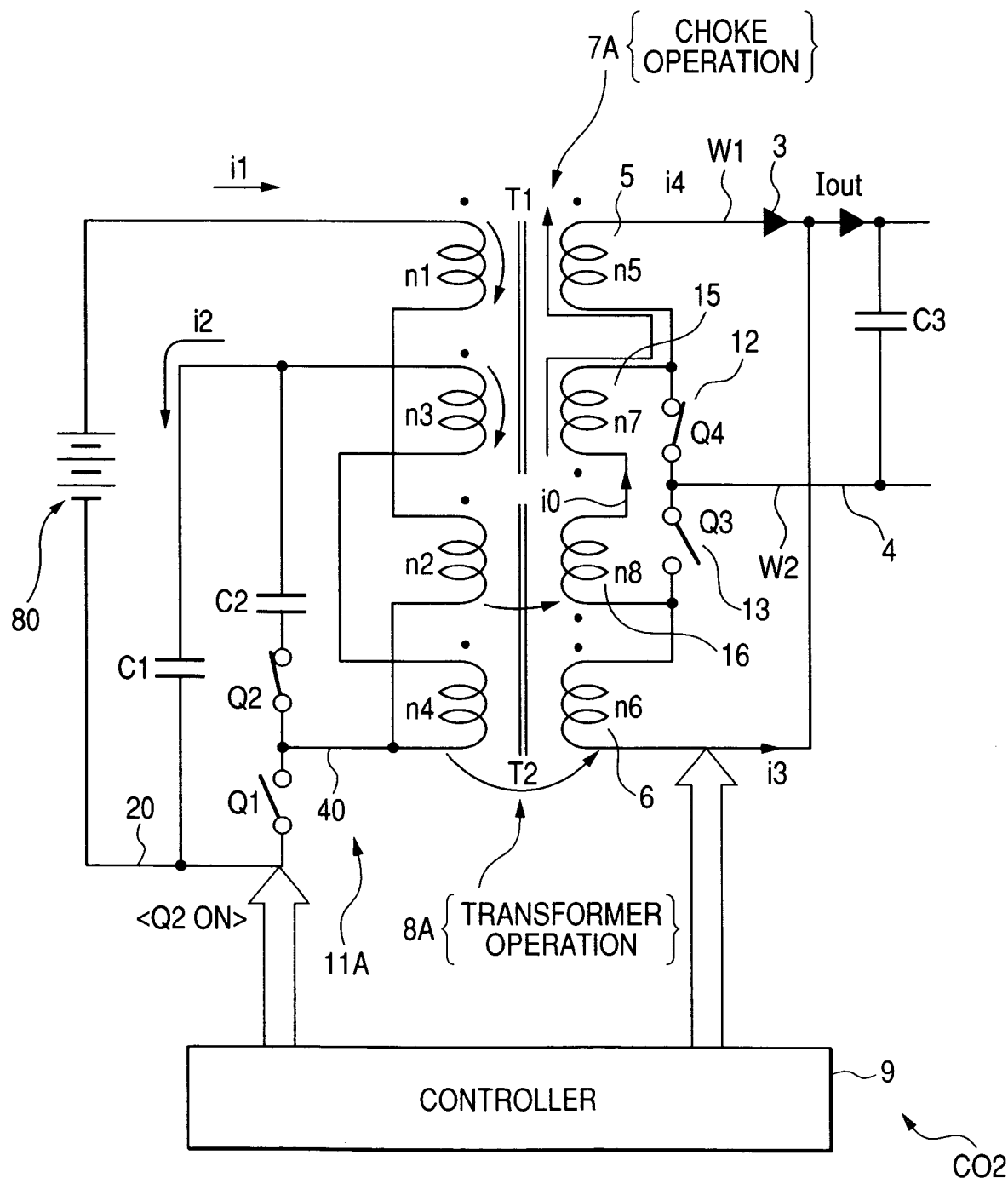
FIG. 5 is a circuit diagram illustrating a state of the input to output isolated DC to DC converter during a second half wave period according to the third embodiment of the present invention.

In addition, the DC to DC converter CO2 illustrated in FIGS. 4 and 5 has no choke coils between the battery 80 and each of the secondary terminals 3 and 4. This allows the synchronous rectifying circuit composed of the switching elements Q3 and Q4 to easily easily out inverter operations, so that rectifying operations of the inverter circuit 11 makes it possible to transfer power from the secondary terminals 3 and 4 to the primary terminals 1 and 2.

Modifications

In the third embodiment and its modifications, the present invention is applied to a step-down DC to DC converter, but the present invention in not limited to the application. Specifically, a change of the ratio of the number of turns of each primary winding of each of the first and second transformers 7 (7A) and 8 (8A) to the number of turns of each secondary winding thereof allows the DC to DC converter CO2 illustrated in FIGS. 4 and 5 to operate as a step-up DC to DC converter (boosting DC to DC converter).

Moreover, in the first to third embodiments and their modifications, at least one the switching elements Q3 and Q4 can be replaced into a rectifying diode. In FIGS. 1, and 3 to 5, the secondary terminal 3 is a high-potential terminal and the secondary terminal 4 is a low-potential terminal, such as a ground terminal, but the DC to DC converter can be configured such that the secondary terminal 3 is a low-potential terminal and the secondary terminal 4 is a high-potential terminal.

Figure 7:
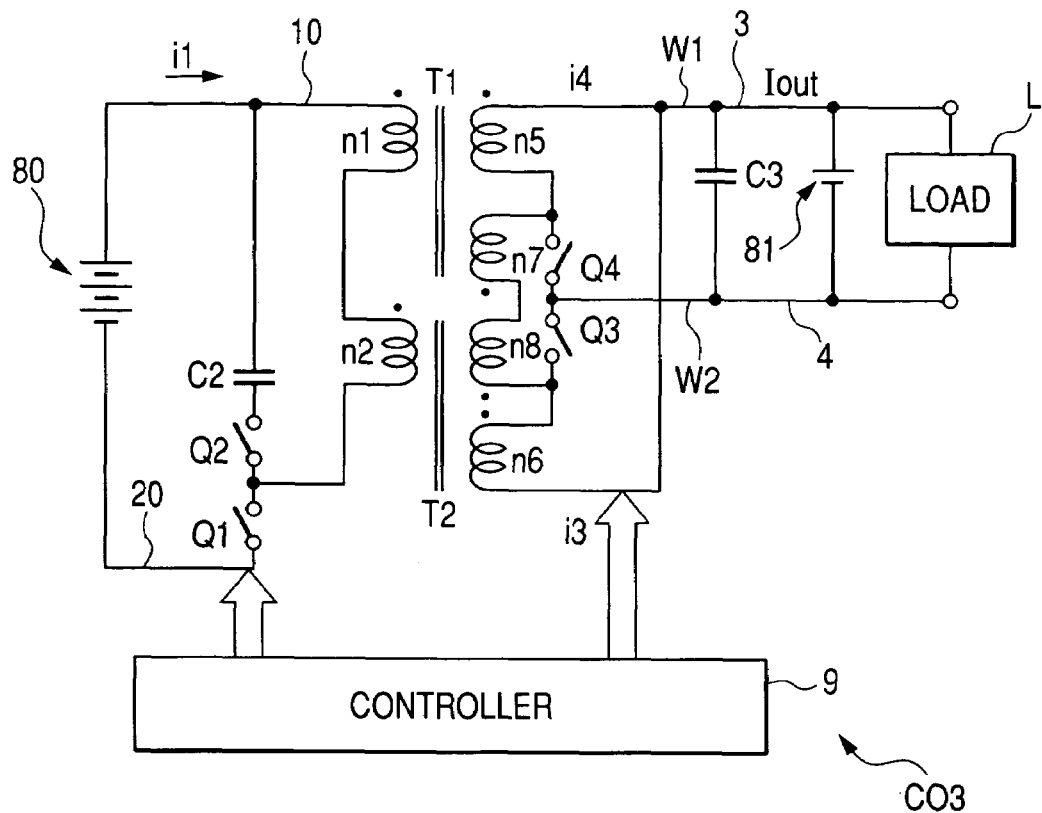
FIG. 7 is a circuit diagram illustrating an overall structure of an input to output isolated DC to DC converter according to a modification of the third embodiment of the present invention.

The inverter circuit 11 of the DC to DC converter CO illustrated in FIG. 1 can adopt various types of circuit structures in addition to the circuit structure of the inverter circuit 11A illustrated in FIGS. 4 and 5. As a modification, as illustrated in FIG. 7, an inverter circuit 11B of a DC to DC converter CO3 has the circuit structure such that the primary windings n3 and n4 and the capacitor C1 are omitted and the capacitor C2 is connected between the wire 10 and the sub switching element Q2, as compared with the circuit structure of the inverter 11A. The DC voltage of the battery 80 is applied between the wires 10 and 20. The reference character L represents an electrical load connected to the secondary terminals 3 and 4, and the reference numeral 81 represents a secondary DC power source (battery) connected to the secondary terminals 3 and 4 in parallel to the electrical load L.

In the modification, during the first half-wave period, the on state of the main switching element Q1 and the off state of the main switching element Q2 allow the DC voltage of the battery 80 to cause a current i1 to flow into the primary windings n1 and n2 from the dot-ends thereof, thereby passing therethrough.

At that time, the capacitor C2 has been charged for a second half wave period prior to this first half wave period so that the charged voltage across the capacitor C2 is higher than the average voltage of the battery 80. This allows the capacitor C2 to discharge a current i2 so that the current i2 flows into the primary windings n1 and n2 from the dot-ends thereof and passes therethrough.

Specifically, in the modification, because the currents i1 and i2 flowing into the primary windings n1 and n2 from the dot ends thereof and passing therethrough increases over time, it sets up magnetic flux around each of the primary windings n1 and n2, so that a secondary voltage across each of the secondary windings n5, n7, n8, and n6 having the dot-mark indicated positive polarity is induced.

Because the switching element Q4 is in on state during the first half wave period, the secondary voltage induced across the secondary winding 5 allows a current i4 to flow out of the dot-end of the winding 5 through the wire W1 and the secondary terminal 3.

In addition, the secondary voltage induced across the first additional secondary winding 15 allows a current i01 to flow out of the dot-end of the winding n7 through the second additional secondary winding n5 and the second original secondary winding n6 in this order. The current i01 flows out to the secondary terminal 3 through the wire W1 as a load current i3.

Other operations and effects of the DC to DC converter CO3 are substantially identical with those of the DC to DC converter CO2 according to the third embodiment.

Figure 8:
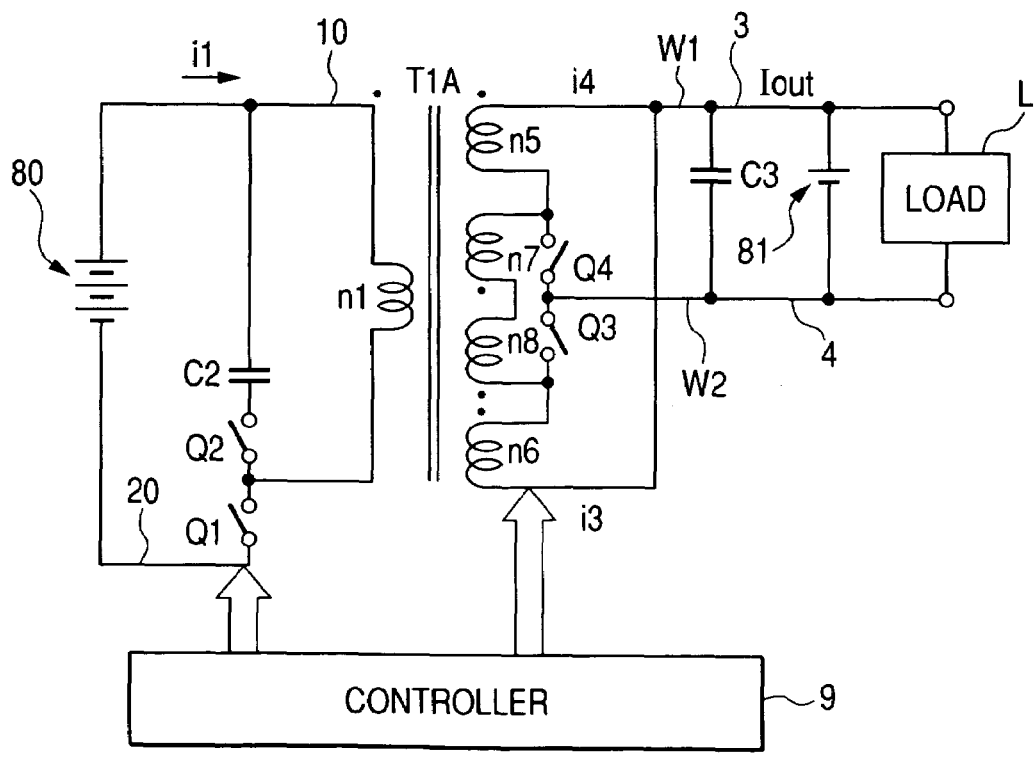
FIG. 8 is a circuit diagram illustrating an overall structure of an input to output isolated DC to DC converter according to another modification of the third embodiment of the present invention.

In addition, single primary winding, such as a primary winding n1, can be wound around the core T1 of the first transformer 7A and the core T2 of the second transformer 8A. This structure allows the magnetic flux set up around the single primary winding to be separately transferred to the core T1 of the first transformer 7A and the core T2 of the second transformer 8A. In this modification, as illustrated in FIG. 8, the first transformer 7A and the second transformer 8A of a DC to DC converter share a single core T1A such that the magnetic paths of them are integrated with each other.

Figure 9:
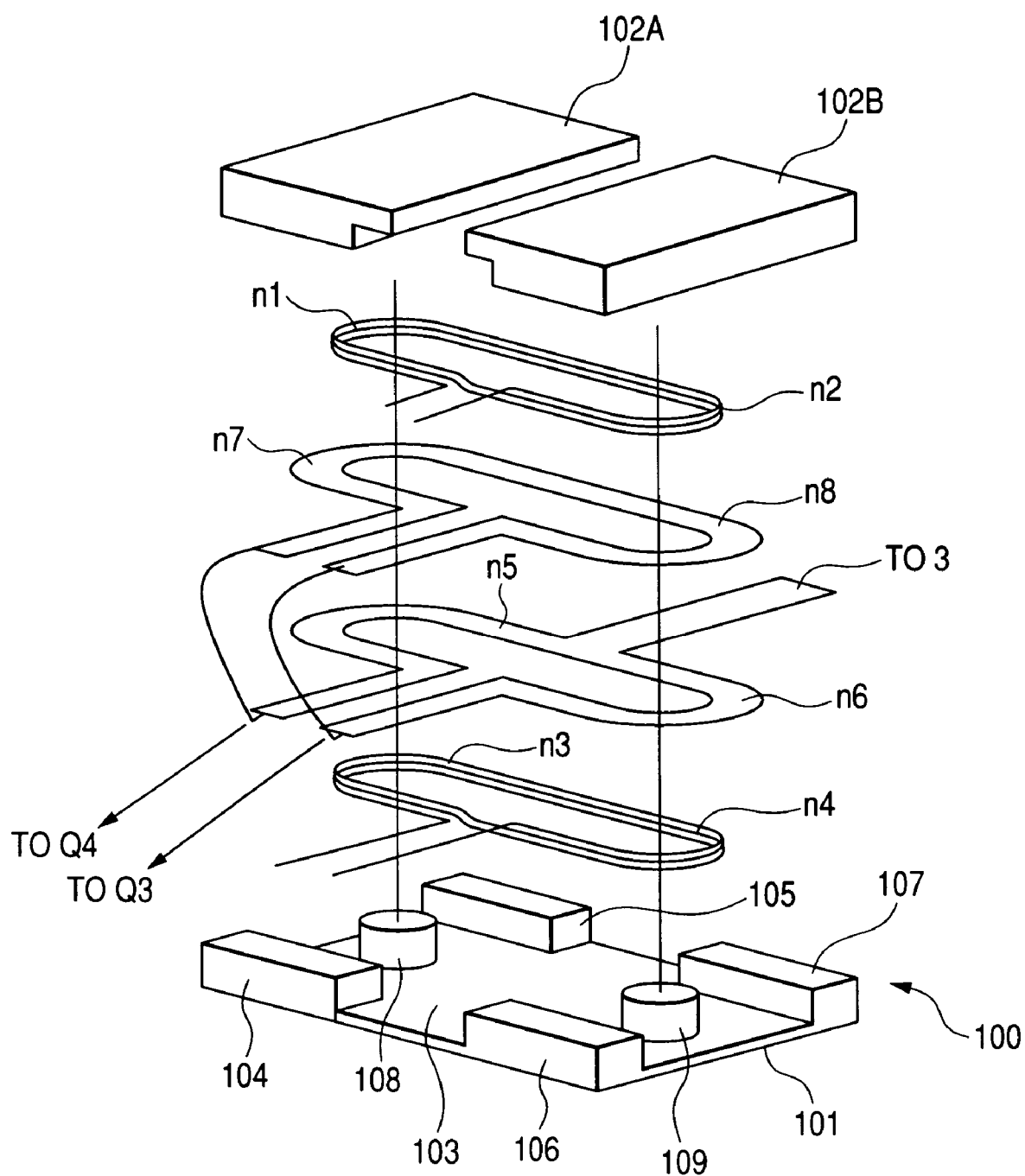
FIG. 9 is an exploded perspective view schematically illustrating an example of the configuration of an integrated transformer according to a further modification of the present invention.

As a further modification, the first and second transformer 7A and 8A illustrated in FIGS. 4 and 5 can be integrated with each other. An example of the configuration of the integrated transformer is illustrated in FIG. 9.

A core 100 is provided with a bottom plate core 101 and a pair of first and second top cores 102A and 102B. The cores 101, 102A, and 1021B are made of a ferrite molding. The bottom plate core 101 is composed of a plate-like bottom yoke 103, and a first center cylindrical pole 108 mounted at the center of one lateral end of an inner surface (upper surface in FIG. 9) of the bottom yoke 103 to be vertically arranged thereon.

The bottom plate core 101 is also composed of a pair of rectangular-cylindrical side poles 104 and 105 vertically arranged at peripheral edges of the one lateral end of the inner sure of the bottom yoke 103 such that the side poles 104 and 105 are opposite to the first center cylindrical pole 108.

In addition, the bottom plate core 101 is composed a second center cylindrical pole 109 mounted at the center of the other lateral end of the inner surface of the bottom yoke 103 to be vertically arranged thereon. The bottom plate core 101 is also composed of a pair of rectangular-cylindrical side poles 106 and 107 vertically arranged at peripheral edges of the other lateral end of the inner surface of the bottom yoke 103 such that the side poles 106 and 107 are opposite to the second center cylindrical pole 109.

The first top core 102A is mounted on top portions of the side poles 104 and 105, and the second top core 102B is mounted on top portions of the side poles 106 and 107 such that the first and second top cores 102A and 102B are apart from each other with a predetermined gap.

Specifically, the bottom yoke 103, the side poles 104 and 105, and the first top core 102A constitute the first transformer 7A, and the bottom yoke 103, the side poles 106 and 107, and the second top core 102B constitute the second transformer 8A.

The primary windings n3 and n4, the first and second original secondary windings n5 and n6, the first and second additional secondary windings n7 and n8, and the primary win n1 and n2 are wound around the center poles 108 and 109, respectively, such that they are laminated in the axial direction of the poles 108 and 109.

Each of the original secondary windings n5 (5) and n6 (6) consists of half turns of a resin-coated bus-bar, and similarly, each of the additional secondary windings n7 (15) and n8 (16) consists of half tuns of a resin-coated bus-bar. This makes it possible to simply produce the integrated transformer.

While there has been described what is at present considered to be the embodiments and modifications of the invention, it will be understood that various modifications which are not described yet may be made therein, and it is intended to cover in the appended claims all such modifications as fall within the true spirit and scope of the invention.

What is claimed is:

1. A DC to DC converter for converting a DC input power into a DC output power through first and second output terminals, the DC to DC converter comprising:
an inverter circuit configured to convert the DC input power into an AC power;
a transformer circuit including a primary winding and a secondary winding member and configured to convert the AC power applied to the primary winding from the inverter circuit into an output power, the secondary winding member being composed of a first secondary winding, a second secondary winding, a third secondary winding, and a fourth secondary winding, the first to fourth secondary windings being connected in series, the series-connected first to fourth secondary windings having one and the other ends, the one and the other ends of the series-connected first to fourth secondary windings being connected to the first output terminal, the first and second secondary windings being wound around a first magnetic path in opposite directions so as to be electromagnetically coupled to the primary winding, the third and fourth secondary windings being wound around a second magnetic path in opposite directions so as to be electromagnetically coupled to the primary winding;

a first rectifying element connected between the second output terminal and a connection point between the first and second secondary windings; and a second rectifying element connected between the second output terminal and a connection point between the third and fourth secondary windings.

2. A DC to DC converter according to claim 1, wherein the number of turns of the first secondary winding and the number of turns of the second secondary winding are substantially equal to each other, and the number of turns of the third secondary winding and the number of turns of the fourth secondary winding are substantially equal to each other.

3. A DC to DC converter according to claim 1, wherein the transformer circuit includes a first transformer with a first core including the first magnetic path and a second transformer with a second core including the second magnetic path, the primary winding being wound around the first and second cores, the first and second secondary windings being wound around the first core, the third and fourth secondary windings being wound around the second core, and wherein the inverter circuit alternately applies the AC power to the paired first and second secondary windings and the paired third and fourth secondary windings.

4. A DC to DC converter according to claim 1, wherein the first magnetic path and the second magnetic path constitute a common magnetic path, and the first and the fourth secondary windings are wound around the common magnetic path in the same direction.

5. A DC to DC converter according to claim 1, wherein the inverter circuit comprises:

a first switching element with one and the other ends, the one end of the first switching element being connected to one end of the primary winding;

a second switching element with one and the other ends, the one end of the second switching element being connected to the one end of the first switching element; and a capacitor connected between the other end of the primary winding and the other end of the second switching element to constitute a closed loop between the primary winding, the second switching element, and the capacitor, the DC input power being applied between the other end of the first switching element and the other end of the primary winding.

6. A DC to DC converter according to claim 1, wherein the primary winding consists of first and second primary windings, one end of the first primary winding is connected to one end of the second primary winding in series, and wherein the inverter circuit comprises:

a first switching element with one and the other end, the one end of the first switching element being connected to the other end of the second primary winding;

a second switching element with one and the other end, the one end of the second switching element being connected to the one end of the first switching element; and a capacitor connected between the other end of the first primary winding and the other end of the second switching element to constitute a closed loop between the first and second primary windings, the second switching element, and the capacitor, the DC input power being applied between the other end of the first switching element and the other end of the first primary winding.

7. A DC to DC converter according to claim 3, wherein the primary winding consists of first to fourth primary windings, the first and second primary windings being wound around the first core, the third and fourth primary windings being wound around the second core, one end of the first primary wind being connected to one end of the third primary winding, one end of the second primary winding being connected to one end of the fourth primary winding, and wherein the inverter circuit comprises:

a first switching element with one and the other end, the one end of the first switching element being connected to the other ends of the third and fourth primary windings;

a second switching element with one and the other end, the one end of the second switching element being connected to the one end of the first switching element;

a first capacitor connected between the other end of the first switching element and the other end of the second primary winding so that the first capacitor is connected to the first to fourth primary windings in series, the second and fourth primary windings, the first switching element, and the first capacitor constituting a first closed loop therebetween; and a second capacitor connected between the other end of the second switching element and the other end of the second primary winding, the second and fourth primary windings, the second switching element, and the second capacitor constituting a second closed loop therebetween, the DC input power being applied between the other end of the first switching element and the other end of the first primary winding.

8. A DC to DC converter according to claim 7, wherein the first and second rectifying elements are third and fourth switching elements each with a control terminal, respectively, and the first and second switching elements have control terminals, respectively, further comprising a controller connected to the control terminals of the first and second rectifying elements and those of the first and second switching elements, the controller being operative to:

keep the first and third switching elements on during a first half period;

keep the second and fourth switching elements on during a first half period;

switch the first and third switching elements to be kept off during a second half period; and switch the second and fourth switching elements to be kept on during the second half period.

* * * * *